Sept. 5, 1933.   F. A. PAMPEL   1,925,990
LOADING MECHANISM FOR TRAVELING CONVEYERS
Filed Sept. 19, 1931   2 Sheets-Sheet 1

Sept. 5, 1933.    F. A. PAMPEL    1,925,990
LOADING MECHANISM FOR TRAVELING CONVEYERS
Filed Sept. 19, 1931    2 Sheets-Sheet 2

Inventor
F. A. Pampel,
By Barker & Collings
Attorneys

Patented Sept. 5, 1933

1,925,990

UNITED STATES PATENT OFFICE 1,925,990

LOADING MECHANISM FOR TRAVELING CONVEYERS

Frederick A. Pampel, Milwaukee, Wis., assignor to Chain Belt Company, Milwaukee, Wis., a corporation of Wisconsin Application September 19, 1931
Serial No. 563,866

4 Claims. (Cl. 198—56)

This invention relates to loading apparatus for traveling conveyers and has for one of its objects to provide apparatus of this character which will be simple in construction, comparatively inexpensive to manufacture and install, and more efficient in use than those which have been heretofore proposed.

The invention relates more particularly to mechanism for loading a material or materials onto a traveling belt conveyer from one or more material-holding bins or hoppers positioned above the said conveyer, and has for a further object the provision of a movable chute in connection with each hopper, each of which chutes is movable from a discharging position in close proximity to the belt conveyer to a non-discharging position sufficiently removed therefrom to prevent interference by subsequent chutes with material which has been deposited on the conveyer from a preceding hopper or hoppers.

A still further object of the invention is to provide controlling gates associated with each chute together with means for moving such gates to and from closed position, there also being lost motion chute operating connections between the gate operating means and its associated chute, whereby the chute will not be moved to non-discharging position until after the gate has been closed, and contra, the chute will be lowered to discharging position before the gate is opened.

A still further object of the invention is to provide the side walls of the chutes with flexible sealing members for engagement with the traveling conveyer when the chutes are in discharging position, whereby any material being discharged by the chutes onto the conveyer will be prevented from working its way between the chute walls and the conveyer belt and over the sides of the latter. The said flexible sealing members also reduce friction between the chute and the belt thereby tending to eliminate undue wear upon the latter.

With the above and other objects in view which will appear as the description proceeds, the invention consists in the novel details of construction and combinations of parts more fully hereinafter described and particularly pointed out in the appended claims.

Referring to the accompanying drawings forming a part of this specification in which like reference characters designate like parts in all the views:—

Figure 1:
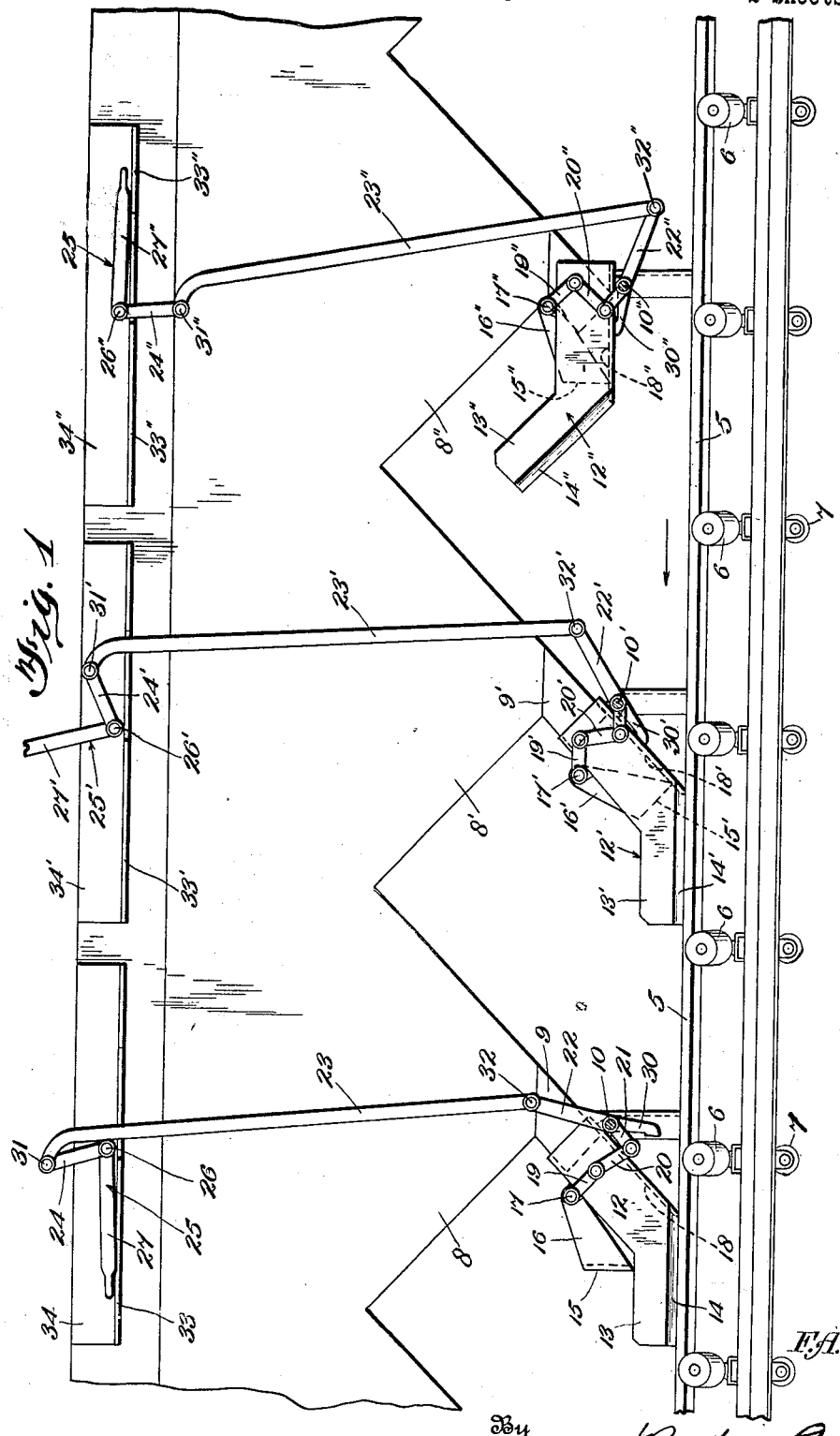
Figure 1 is a fragmentary side elevational view of a traveling belt conveyer, illustrating three material supply hoppers associated therewith, each of which is provided with charging means constructed in accordance with the present invention.
Figure 2:
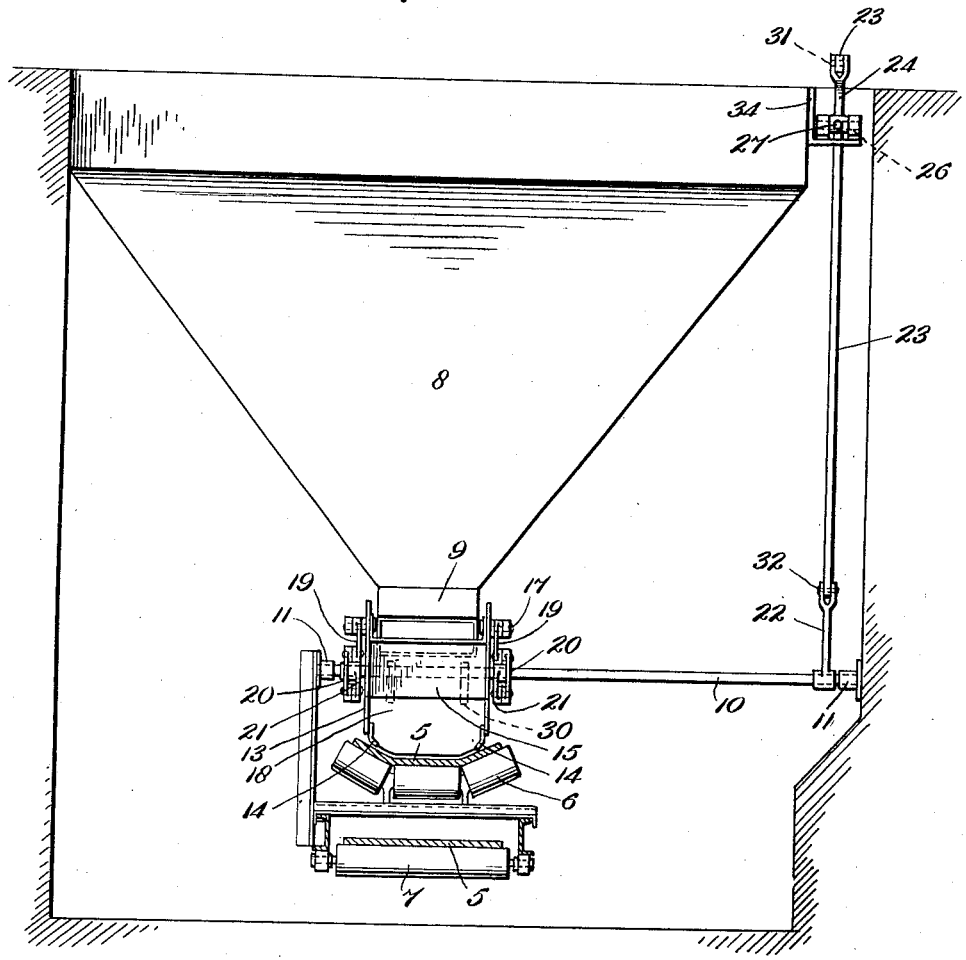
Figure 2 is a transverse sectional elevational view of the parts shown in Figure 1, as seen from the left of said figure.

Referring more particularly to the said drawings 5 indicates a traveling conveyer of any suitable construction here shown as comprising a flexible belt, the upper run of which is mounted upon suitable troughing rolls 6 and the lower run of which is supported by the straight cylindrical return rolls 7, all as is well known in the art. Mounted above the said conveyer 5 and preferably in longitudinal alignment therewith is a series of material-receiving and holding hoppers or bins 8, 8' and 8''. Although three hoppers have been illustrated in Figure 1 it will of course be understood that one or any number of such hoppers may be employed, as conditions require.

The loading mechanism constituting the present invention has been shown in connection with each of the hoppers 8, 8' and 8'' and such mechanisms, while identical in construction, have been ilustrated in three different positions which they assume in the course of operation. The mechanism associated with the hopper 8 will be described in detail, with the corresponding parts of the mechanisms associated with 8' and 8'' indicated by corresponding reference characters having prime (') and double prime ('') exponents respectively.

The hopper 8 terminates at its lower end in an inclined rectangular conduit or spout 9 below which is mounted a transversely extending shaft 10 oscillatable in suitable bearings 11. Loosely mounted on the said shaft 10 is a chute 12, the side walls 13 of which when in its lowered position, extend downwardly into close proximity with the upper surface of the conveyer belt 5. The said side walls along their lower edges are provided with rubber or other similar flexible strips or sealing members 14 which are adapted to yieldably engage the upper surface of the said conveyer belt and prevent material traveling through the said chute onto the belt from working its way laterally over the edges of the belt, as will be readily understood. The said flexible members 14 also tend to eliminate wear upon the belt 5, which would otherwise occur if the side walls 13 were extended downwardly so as to contact with the belt.

Figure 3:
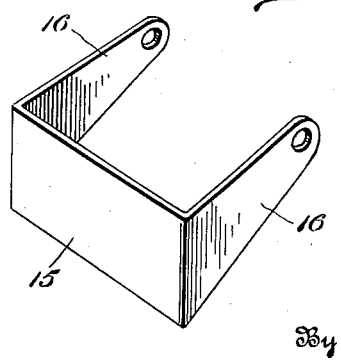
Figure 3 is a detail perspective view of one of the material controlling gates.

The chute 12 carries a pivoted gate or valve 15 which may comprise the substantially U-shaped structure shown in detail in Figure 3, the legs 16 of which are pivotally mounted as at 17 upon the side walls of the chute 12. The gate 15 is illustrated in its open position while the gate 15' and 15" are shown in their closed positions, that is with the lower edge of the gates in contact with the bottom walls 18' and 18" of the chutes 12' and 12" respectively.

For moving the gate 15 to and from open position each pivot 17 thereof is provided with a lever arm 19, which arms are connected by links 20 to arms 21 rigidly carried by the shaft 10. The said shaft is also provided with a lever arm 22 pivotally connected through a link 23 with one arm 24 of a bell crank lever 25, pivoted as at 26, and the other arm 27 of which constitutes a hand lever whereby the parts may be operated.

The mechanism just described constitutes the means for moving the gate 15 from open to closed position and vice versa, it being obvious from Figure 1 that when the hand operating lever such as 27 is swung to the position such as that occupied by the lever 27' the shaft 10 will, through the link 23 and arm 22, be moved in a clockwise direction. This movement of the said shaft will through the arms 21, links 20 and arms 19, rock the pivots 17 together with the gate 15 in a counterclockwise direction so that said gate will assume the position illustrated for the gate 15'. Such movement of the gate will of course cut off the flow of material through the chute 12 as will be readily understood.

For raising the chute 12 after the flow of material has been thus cut off, in order that it may not interfere with the material deposited on the conveyer from preceding hoppers such as 8' and 8", the shaft 10 is provided with one or more rigid depending arms 30 which are so disposed relative to the bottom wall 18 of the chute that they will move through an arc of predetermined extent from the position shown in connection with chute 12 to that shown in connection with chute 12' before they contact with the said bottom wall. In other words, there will be lost motion between the arms 30 and the chute 12 during the closing of the gate 15 as above described, but as soon as the said gate reaches its closed position the said arms 30 will engage the lower surface of the bottom wall of the chute, and continued operation of the hand lever 27 will then cause the said arms to raise the chute together with the gate to the position illustrated in connection with chute 12". In this position the chute obviously is elevated a sufficient distance to clear any material which has been deposited upon the conveyer belt 5 from a preceding hopper and therefore there will be no interference between such material and the succeeding chutes when they are so raised. The elevation of the chutes in this manner also removes the flexible sealing members 14 from engagement with the conveyer belt and reduces such wear as they may cause upon said belt.

The arms 22, links 23 and bell crank levers 25 are preferably so constructed and assembled as to afford a togglelock for the charging mechanism as will be readily apparent from Figure 1, which serves to maintain the gate in its open position as shown at the left of said figure, and also to maintain the chute in its elevated position shown at 12" at the right of said figure. That is to say, with the parts in the position shown at the left of Figure 1 the pivot 31 between the link 23 and the arm 24 has been moved to the left of the center line extending between pivots 26 and 32, and any tendency of the gate 15 to drop under the influence of gravity from its elevated position here shown will be transmitted through the arms 19, links 20, arms 21 and 22 and link 23 to the bell crank lever 25 tending to move the latter in a counterclockwise direction, which movement however is prevented through engagement of the hand lever 27 with the flange 33 of the angle member 34 carried by the hopper. In like manner when the parts are in the double prime positions illustrated in the right of Figure 1 the pivot 31" is again to the left of the center line extending between pivots 26" and 32" and any tendency for the chute 12" to fall will through the arms 30" and 22" tend to raise the link 23" and move the bell crank lever 25" in a clockwise direction, which likewise will be prevented through engagement of the hand lever 27" with the right hand portion of the flange 33" of the angle member 34".

While one form of the invention has been illustrated and described, it is obvious that those skilled in the art may vary the details of construction as well as the precise arrangement of parts without departing from the spirit of the invention, and therefore it is not wished to be limited to the above disclosure except as may be required by the claims.

What is claimed is:

1. Loading apparatus for traveling conveyers, comprising a material holding hopper positioned above said conveyer; a material conducting chute mounted below said hopper, movable from a discharge position in proximity to said conveyer to a non-discharge position removed therefrom, said chute being adapted in its discharge position to continuously transfer material from the hopper to the conveyer; a movable gate carried by said chute for controlling the passage of material therethrough; and a single means for sequentially moving said gate from open to closed position to cut off the flow of material through said chute, and then moving said chute from discharge to non-discharge position.

2. Loading apparatus for traveling conveyers, comprising a material holding hopper positioned above said conveyer; a material conducting chute mounted below said hopper, movable from a discharge position in proximity to said conveyer to a non-discharge position removed therefrom; a movable gate carried by said chute for controlling the passage of material therethrough; means for moving said gate from open to closed position; and lost motion connections between said moving means and said chute for moving the latter from discharging to non-discharging position subsequent to the closing of said gate.

3. Loading apparatus for traveling conveyers, comprising a material holding hopper positioned above said conveyer; a material conducting chute pivotally mounted below said hopper, movable in a vertical arc from a discharge position in engagement with said conveyer to a non-discharge position elevated thereover; a pivoted gate carried by said chute for controlling the passage of material therethrough; means including operating levers and linkage connections for swinging said gate from open to closed position, and vice versa; and lost motion connections between said gate operating means and chute, including an arm for engaging said chute, for swinging said chute upwardly from discharging position to non-discharging position subsequent to the closing of said gate, and lowering said chute to discharging position prior to the opening of said gate.

4. In loading apparatus for traveling conveyers, a plurality of material-holding hoppers positioned above and adapted to discharge material at intervals along said conveyer; a movable chute below each hopper for conducting material therefrom to said conveyer, said chutes in their discharge positions being closely adjacent said conveyer; and means for moving each chute to a non-discharge position sufficiently removed from said conveyer to avoid interference by such chutes with material deposited on the conveyer from a preceding hopper.

FREDERICK A. PAMPEL.